US012753126B2

(12) United States Patent
Hablot et al.

(10) Patent No.: US 12,753,126 B2
(45) Date of Patent: Oct. 6, 2026

(54) SILICON CONTAINING EMULSION POWDERS FOR USE IN MAKING CEMENT BASED ON TILE ADHESIVE DRY MIX COMPOSITIONS

(71) Applicants: Dow Global Technologies LLC, Midland, MI (US); Dow Silicones Corporation, Midland, MI (US)

(72) Inventors: Elodie Hablot, Horgen (CH); Margarita Perello, Madrid (ES); Jean-Paul Lecomte, Brussels (BE)

(73) Assignees: DOW GLOBAL TECHNOLOGIES LLC, Midland, MI (US); DOW SILICONES CORPORATION, Midland, MI (US)

( * ) Notice: Subject to any disclaimer, the term of this patent is extended or adjusted under 35 U.S.C. 154(b) by 457 days.

(21) Appl. No.: 18/263,642

(22) PCT Filed: Apr. 13, 2022

(86) PCT No.: PCT/US2022/024528
§ 371 (c)(1),
(2) Date: Jul. 31, 2023

(87) PCT Pub. No.: WO2022/221357
PCT Pub. Date: Oct. 20, 2022

(65) Prior Publication Data

US 2024/0101487 A1 Mar. 28, 2024

Related U.S. Application Data

(60) Provisional application No. 63/175,279, filed on Apr. 15, 2021.

(51) Int. Cl.

| | |
|---|---|
| ***C04B 14/06*** | (2006.01) |
| ***C04B 14/10*** | (2006.01) |
| ***C04B 20/10*** | (2006.01) |
| ***C04B 24/26*** | (2006.01) |
| ***C04B 24/38*** | (2006.01) |
| ***C04B 24/42*** | (2006.01) |
| ***C04B 28/04*** | (2006.01) |
| ***C04B 40/00*** | (2006.01) |
| *C04B 103/00* | (2006.01) |
| *C04B 111/00* | (2006.01) |

(52) U.S. Cl.
CPC .......... *C04B 40/0042* (2013.01); *C04B 14/06* (2013.01); *C04B 14/106* (2013.01); *C04B 20/1029* (2013.01); *C04B 24/2635* (2013.01); *C04B 24/2688* (2013.01); *C04B 24/383* (2013.01); *C04B 24/42* (2013.01); *C04B 28/04* (2013.01); *C04B 2103/0054* (2013.01); *C04B 2111/00637* (2013.01)

(58) Field of Classification Search
CPC ................ C04B 40/0042; C04B 14/06; C04B 14/106; C04B 20/1029; C04B 24/2635; C04B 24/2688; C04B 24/383; C04B 24/42; C04B 28/04; C04B 2103/0054; C04B 2111/00637; C04B 18/022; C04B 28/02; C04B 40/0608
USPC .......................................................... 523/206
See application file for complete search history.

(56) References Cited

U.S. PATENT DOCUMENTS

| | | | |
|---|---|---|---|
| 6,090,868 A | 7/2000 | Eck et al. | |
| 6,569,939 B2 | 5/2003 | Eck et al. | |
| 7,851,521 B2 | 12/2010 | Bacher et al. | |
| 8,445,560 B2 | 5/2013 | Lecomte et al. | |
| 8,470,120 B2 | 6/2013 | Killat et al. | |
| 9,181,130 B2 | 11/2015 | Dombrowski et al. | |
| 9,221,717 B2 | 12/2015 | Hashemzadeh et al. | |
| 9,522,986 B2 | 12/2016 | Hashemzadeh et al. | |
| 2010/0240819 A1 | 9/2010 | Perello et al. | |
| 2015/0307399 A1* | 10/2015 | Kiesewetter ........ | C04B 24/2623 524/5 |
| 2015/0307684 A1 | 10/2015 | Hashemzadeh et al. | |

FOREIGN PATENT DOCUMENTS

| | | |
|---|---|---|
| CN | 108083680 | 5/2018 |
| CN | 110922137 | 3/2020 |
| EP | 496510 | 7/1992 |
| EP | 0811584 | 12/1997 |
| WO | 2008062018 | 5/2008 |
| WO | 2012019908 | 2/2012 |

OTHER PUBLICATIONS

Bartelmus, "Die Analytik von Celluloseathergruppen", Fresenius Zeitschrift fuer Analytische Chemie, 1977, vol. 286, pp. 161-190.
Fox, Bull. Am. Physics Soc., 1956, vol. 1, No. 3, p. 123.
PCT/US2022/024528 International Search Report and Written Opinion with a mailing date of Jul. 29, 2022.

* cited by examiner

*Primary Examiner* — Hannah J Pak

(57) ABSTRACT

The present invention provides a storage stable silicon-containing powder composition suitable for use in dry mix compositions containing cement and filler suitable as cement-based tile adhesives, the powder composition comprising (i) a water redispersible polymer powder (RDP); and, (ii) a granular composition of (a) a silicate carrier, (b) a polydiorganosiloxane, (c) a hydrolysable silane containing a $C_4$ to $C_{12}$ alkyl group, or an oligomer thereof, and (d) a polymer encapsulant for the hydrolysable silane and the polydiorganosiloxane, wherein the weight ratio of the total RDP to the total weight of granular composition ranges from 90:10 to 98:2. The present invention provides methods of using dry mixes as cement-based tile adhesives wherein the powder composition enables good open time and excellent tensile adhesion, especially after heat aging.

10 Claims, No Drawings

SILICON CONTAINING EMULSION POWDERS FOR USE IN MAKING CEMENT BASED ON TILE ADHESIVE DRY MIX COMPOSITIONS

FIELD OF THE INVENTION

The present invention relates to storage stable powder compositions for use in cementitious dry mix compositions for making cement based tile adhesives and comprising a water redispersible polymer powder, and a granular composition of a silicate carrier, a polydiorganosiloxane, a hydrolysable silane containing a $C_4$ to $C_{12}$ alkyl group, such as an octyltriethoxysilane, and a polymer encapsulant, as well as the cementitious dry mix compositions containing them, mortars or tile adhesives made therefrom and methods for using the compositions.

BACKGROUND OF THE INVENTION

Cement-based tile adhesives comprise dry mix compositions that are commonly formulated with cellulose ethers, cement and sand or finely divided fillers. The dry mix compositions are mixed with water, allowed to sit to build a proper consistency of 400 to 650 Pa·S at 25° C. and are then applied to a substrate against which the tile will be laid. Such adhesives can be used for more demanding applications; however, they may not provide the requisite flexibility and water or heat resistance for such applications. Water redispersible polymer powders (RDPs) employed in mortars in various construction applications, such as in cement-based tile adhesives, impart flexibility and water resistance properties to varying degrees. However, ethylene-vinyl acetate polymer RDPs which are relatively inexpensive fail to impart acceptable tensile adhesion strength after water immersion and heat aging. More recent attempts at improving the water resistance properties of cement-based tile adhesives containing RDPs have included silicon-containing organic additives.

Nevertheless, such materials have generally lacked storage stability and have not provided both an acceptable open time and improved tensile adhesion after at least one of water immersion or heat aging.

WIPO publication WO2012019908A1, to Wacker Chemie AG (Wacker) discloses cement-based tile adhesives comprising polymer powder compositions of addition polymers which are redispersible in water (RDPs) formed from an aqueous dispersion in a relatively storage stable formulation containing one or more additives selected from organosilicon compounds, fatty acids and the fatty acid derivatives thereof, or hydrocarbon waxes, and one or more protective colloids. The additives may be included in the RDP before or during addition polymerization or before drying of the polymer dispersion. However, the Wacker compositions do not enable all of improved adhesion after water immersion or heat ageing and acceptable open time.

The present invention seeks to solve the problems of enabling the provision storage stable silicon-compound containing compositions that when used in cementitious cement-based tile adhesive compositions impart water and heat aging resistance, while maintaining an acceptable open time.

STATEMENT OF THE INVENTION

In accordance with the present invention, a storage stable powder composition comprises:

(i) a water redispersible polymer powder (RDP), such as an RDP containing an ethylene-vinyl acetate (VaE) copolymer, acrylate copolymer, or styrene acrylate copolymer, preferably, a VaE copolymer that does not contain, in copolymerized form, monomers containing a $C_4$ or higher alkyl group, for example, a VaE copolymer that does not contain, in copolymerized form, monomers other than ethylene and vinyl acetate; and, (ii) a granular composition of (a) a silicate carrier, such as a zeolite or an aluminum silicate, for example, sodium aluminum silicate, (b) a polydiorganosiloxane, (c) a hydrolysable silane containing a $C_4$ to $C_{12}$ alkyl group, or an oligomer thereof, preferably, a $C_6$ to $C_9$ alkyl group, or, more preferably, an octyltrialkoxysilane or an oligomer thereof, and (d) a polymer encapsulant for the hydrolysable silane and polydiorganosiloxane, preferably, a polyvinyl alcohol, wherein the weight ratio of the total RDP to the total granular composition ranges from 90:10 to 98:2.

In the storage stable powder composition in accordance with the present invention, the (ii) granular composition comprises (a) from 54 to 89 wt. % or, preferably, from 69 to 85 wt. % of the silicate carrier, (b) from 4 to 15 wt. % or, preferably, from 6 to 12 wt. % of the polydiorganosiloxane, (c) from 6.5 to 25 wt. % or, preferably, from 8 to 15 wt. % of the hydrolysable silane, and (d) from 0.5 to 6 wt. % or, preferably, from 1 to 4 wt. % of the polymer encapsulant for the hydrolysable silane and polydiorganosiloxane. All weight proportions in the granular composition are based on the total weight of the granular composition and add up to 100%.

In the storage stable powder composition in accordance with the present invention, the (a) silicate carrier has a mean diameter (×50) ranging from 0.1 to 5000 μm or, preferably, from 0.2 to 1000 μm, or, more preferably, from 0.2 to 8 μm, or, more preferably, from 1 to 6 μm. In the storage stable powder composition in accordance with the present invention, the (b) polydiorganosiloxane has a room temperature viscosity in neat form of from 40 to 500 mPa·s, or, preferably, from 50 to 150 mPa·s, or, more preferably, from 60 to 80 mPa·s. More preferably, at least one of the (b) polydiorganosiloxanes is a hydroxyl terminal polydi($C_1$ to $C_2$ alkyl) siloxane, such as hydroxy-terminated polydimethylsiloxane.

In the storage stable powder composition in accordance with the present invention, the (c) hydrolysable silane may be an n-octyltriethoxysilane, an n-octyl trimethoxysilane or an oligomer thereof.

In accordance with the present invention, the storage stable powder composition is suitable as a dry mix composition for use in a cement-based tile adhesive and comprises from 0.5 to 5.5 wt. %, or, preferably, from 1 to 5 wt. %, of (i) the water redispersible polymer powder (RDP) and (ii) the granular composition, and, further, comprises cement and sand, one or more fillers or combinations thereof, all amounts being wt. % of total solids in the dry mix composition.

In accordance with the present invention, the storage stable powder composition suitable for use as a dry mix composition in a cement-based tile adhesive comprises:

dry cement, such as ordinary portland cement, in the amount of from 15 to 35 wt. %, or, preferably, from 18 to 30 wt. %, based on the total weight of the powder composition;

from 0.5 to 5.5 wt. %, or, preferably, from 1 to 5 wt. %, based on the total weight of the storage stable powder composition, of a mixture of (i) the water redispersible polymer powder (RDP) and (ii) the granular composition; and, as the remainder of the storage stable powder composition, sand, one or more fillers or combinations thereof, such as a filler having a sieve average particle size of from 80 microns to less than 0.8 mm, all weight proportions in the powder compositions adding up to 100%. The storage stable powder composition in accordance with the present invention may further comprise one or more cellulose ethers.

Preferably, the storage stable powder composition in accordance with the present invention when used as a dry mix composition in a cement-based tile adhesive that has been mixed with water in accordance with EN 12004:2 (2017) at 25° C. to a viscosity of 400 to 650 Pa·s, exhibits a tensile strength as determined according to EN 1348 of at least 1 N/mm$^2$, or, more preferably, at least 1.3 N/mm$^2$ after each one of (i) 28 day aging at 23° C.±2° C. and standard (101.3 kPa) pressure, (ii) 7 days plus 7 hours aging at 23° C.±2° C. and standard (101.3 kPa) pressure and 20 days plus 17 hours water immersion at 23° C.±2° C. and standard (101.3 kPa) pressure, and (iii) 14 day aging at 23° C.±2° C. and standard (101.3 kPa) pressure and then 70° C. heat aging for 14 days. More preferably, the powder composition in accordance the present invention when used in the amount of from 0.5 to 5.5 wt. %, based on the total weight of a cement-based tile adhesive dry mix composition that has been mixed with water in accordance with EN 12004:2 (2017) at 25° C. to a viscosity of 400 to 650 Pa·s, exhibits an open time as determined in accordance with EN 1346 of at least 0.5 N/mm$^2$, or, more preferably, at least 0.9 N/mm$^2$ 20 min after embedding the tile adhesive on a substrate, or, preferably, 30 minutes after embedding the tile adhesive on a substrate.

Even more preferably, the storage stable powder composition in accordance with the present invention when used as a dry mix composition in a cement-based tile adhesive that has been mixed with water in accordance with EN 12004:2 (2017) at 25° C. to a viscosity of 400 to 650 Pa·s, exhibits a tensile strength as determined according to EN 1348 of at least 1 N/mm$^2$, or, more preferably, at least 1.3 N/mm$^2$ after each one of (i) 28 day aging at 23° C.±2° C. and standard (101.3 kPa) pressure, (ii) 7 days plus 7 hours aging at 23° C.±2° C. and standard (101.3 kPa) pressure and 20 days plus 17 hours water immersion at 23° C.±2° C. and standard (101.3 kPa) pressure, and (iii) 14 day aging at 23° C.±2° C. and standard (101.3 kPa) pressure and then 70° C. heat aging for 14 days; and, further, the storage stable powder composition in accordance with the present invention when used in the amount of from 1 to 5 wt. %, based on the total weight of a cement-based tile adhesive dry mix composition that has been mixed with water in accordance with EN 12004:2 (2017) at 25° C. to a viscosity of 400 to 650 Pa·s exhibits an open time as determined in accordance with EN 1346 of at least 0.5 N/mm$^2$, or, more preferably, at least 0.9 N/mm$^2$ 20 min after embedding the tile adhesive on a substrate, or, preferably, 30 minutes after embedding the tile adhesive on a substrate.

In another aspect of the present invention, a method of using the storage stable powder composition in accordance with the present invention comprises mixing the powder composition with water to form a cement-based tile adhesive, applying the adhesive to a substrate to form an adhesive bearing substrate and then applying a tile to the adhesive bearing substrate. The substrate may comprise a porous substrate, for example, concrete, gypsum board, backer board, plywood, wood, a fiber cement board, a cement render, cured mortar, or another unfinished substrate.

Unless otherwise indicated, all temperature and pressure units are room temperature (19 to 23° C.) and standard pressure (1 atm). And, unless otherwise indicated, all conditions include a relative humidity (RH) of 50%.

Unless the context clearly dictates otherwise, the singular forms “a,” “an,” and “the” include plural referents.

Unless defined otherwise, technical and scientific terms used herein have the same meaning as is commonly understood by one skilled in the art.

All phrases comprising parentheses denote either or both of the included parenthetical matter and its absence. For example, the phrase “hydrolysable (alkoxy)silane” includes, in the alternative, hydrolysable alkoxysilane and hydrolysable silanes, such as those having hydrolysable groups other than alkoxysilane groups, such as acetoxy or oxime groups.

All ranges recited are inclusive and combinable. For example, a disclosure of from 6.5 to 25 wt. % or, preferably, from 8 to 15 wt. % of a hydrolysable silane, will include all of from 6.5 to 25 wt. % or, preferably, from 8 to 15 wt. %, or, from 6.5 to 8 wt. % or, from 8 to 25 wt. %, or, from 6.5 to 15 wt. % or, from 15 to 25 wt. % of the hydrolysable silane.

As used herein, the term “anhydroglucose unit” or “AGU” refers to a monosaccharide in (co)polymerized form.

As used herein the term “aqueous” means that the continuous phase or medium is water and from 0 to 10 wt. %, based on the weight of the medium, of water-miscible compound(s).

Preferably, “aqueous” means water.

As used herein, the phrase “based on total solids” refers to weight amounts of all of the non-volatile ingredients in a given composition, including synthetic polymers, cellulose ethers, acids, defoamers, hydraulic cement, fillers, other inorganic materials, and other non-volatile additives. Water, ammonia and volatile solvents are not considered solids.

As used herein the term “DIN EN” or “EN” refers to a European Norm version of a German materials specification, published by Beuth Verlag GmbH, Berlin, DE. And, as used herein, the term “DIN” refers to the German language version of the same materials specification. As used herein the term “dry mix” means a storage stable powder containing cement, cellulose ether or any other polymeric additive, fillers and any dry additives. No water is present in a dry mix; hence it is storage stable.

As used herein the term “DS” is the mean number of alkyl substituted OH-groups per anhydroglucose unit in a cellulose ether; and the term “MS” is the mean number of hydroxyalkyl substituted OH-groups per anhydroglucose unit, as determined by the Zeisel method. The term “Zeisel method” refers to the Zeisel Cleavage procedure for determination of MS and DS, see G. Bartelmus and R. Ketterer, Fresenius *Zeitschrift fuer Analytische Chemie*, Vol. 286 (1977, Springer, Berlin, DE), pages 161 to 190.

As used herein, unless otherwise indicated, the measured glass transition temperature (Tg) is used. As used herein the term “calculated Tg” refers to the Tg of a polymer calculated by using the Fox equation (T. G. Fox, *Bull. Am. Physics Soc.*, Volume 1, Issue No. 3, page 123 (1956)). As used herein the term “measured Tg” means a Tg that is measured using differential scanning calorimetry or DSC conducted in the range of from −100° C. to 200° C. (rate of heating 10° C. per minute, Tg taken at the midpoint of the inflection).

As used herein the term "low or medium viscosity cellulose ether" means a cellulose ether which has a viscosity of from 10,000 to 40,000 mPa·S measured as a 2 wt. % solution in water at 20° C. and a shear rate 2.55 $s^{-1}$ using a Haake Rotovisko™ RV 100 rheometer (Thermo Fisher Scientific, Karlsruhe, DE).

As used herein the term "high viscosity cellulose ether" means a cellulose ether which has a viscosity of more than 40,000 mPa·s measured as a 2 wt. % solution in water using a Haake Rotovisko™ RV 100 rheometer (Thermo Fisher Scientific, Karlsruhe, DE) at 20° C. and a shear rate 2.55 $s^{-11}$.

As used herein, the term "ISO" refers to publications of the International Organization for Standardization, Geneva CH.

As used herein, the term "mean diameter" means the value (×50) or the arithmetic mean as determined by light scattering.

As used herein, the term "mortar viscosity" refers to a viscosity of in Ps (Pa·s) at 25° C. of a mortar mixed in accordance with EN 196-1, section 4.4 or as part of EN 1348, as measured in a cup (h=80 mm, d=100 mm) using a Brookfield viscometer RVDV II Pro (DV-II+) equipped with a Helipath stand and spindle no T-F 96 used at 5 rpm, and calibrated as per the manufacturer's instructions. Acceptable room temperature mortar viscosities may range from 400 to 650 Pa·s.

As used herein, the term "open time" or "open time adhesion" refers to the result as determined in accordance with EN 1346 and shows the length of time within which the wet or back side of a given tile can still be sufficiently wetted and adhered when laying the tile into a combed bed of a given tile adhesive on a base. In the test, the tiles are laid into a bed of a given tile adhesive at 5-minute intervals, i.e. after each of 5, 10, 15, 20, 25 and 30 minutes, and each tile is weighed down with a 3 kg weight for 30 s. After the indicated storage period under the indicated conditions, tensile pull plates are adhered to the front side of the tile and the tiles are pulled off of the base using a tensile tester. The force needed to pull the tiles off the base in N/mm$^2$ is reported as the open time. In a "quick open time" test, after 40 minutes, all the tiles are removed from the base and their down side inspected. Wetting of the rear of the tile with adhesive is determined by counting the area remaining wet rounding the count to ±5% coverage or by determining the force it takes to remove the tile from the substrate using a tensile tester in the same manner as in tensile adhesion testing. Quick Open time means the period of time measured in minutes during which the wetting of the rear of the tile remains 50%.

As used herein, the term "polymer" refers, in the alternative, to a polymer made from one or more different monomer, such as a copolymer, a terpolymer, a tetrapolymer, a pentapolymer etc., and may be any of a random, block, graft, sequential or gradient polymer.

As used herein the term "set" refers to the curing of a cement-based tile adhesive which happens under ambient conditions in the presence of water and continues as the cement-based tile adhesive dries.

As used herein, unless otherwise indicated, the term "sieve average particle size" means an average particle size determined by a LAVIB sieve machine, Siebtechnik, Muelheim, DE; the term "sieve particle size" can be used interchangeably with the term "sieve average particle size".

As used herein, the term "tensile adhesion" refers to the result as determined in accordance with EN 1348 after placing a given tile complying with ISP 13006 on a bed of a given tile adhesive on a given base for a given time and under a defined set of conditions, followed by gluing a tensile test plate to the top of the tile and pulling the tile off the base. The force required to remove the tile from the base is reported in N/mm$^2$ as the tensile adhesion. As used herein, the term "wt. % of total solids" means the weight of all non-volatile ingredients of a given composition, as determined by volatility at temperatures of 40° C. or below and atmospheric pressure. Volatiles include water, solvents that evaporate under conditions of ambient temperature and pressure, like methyl chloride.

As used herein, the term "wt. %" refers to percent by weight.

DETAILED DESCRIPTION OF THE INVENTION

In accordance with the present invention storage stable powder compositions of (i) a water redispersible polymer powder (RDP) and (ii) a granular composition of an polydiorganosiloxane and a hydrolysable silane encapsulated in a dispersible encapsulant polymer or colloidal stabilizer polymer and carried on a silicate carrier enable the provision of dry mixes and mortars for use in making cement-based tile adhesives that have both very good open time and very good tensile adhesion in use. Specifically, the present inventors have discovered a silicon containing composition containing a water redispersible polymer powder (RDP) and a silane and a polydiorganosiloxane used in combination that enables one to improve the open time of a cement-based tile adhesive while enabling improved water and heat aging resistance. Further, the compositions enable the provision of storage stable dry mix compositions that comprise silicon containing additives. The encapsulant polymer enables both the storage stability of dry mixes containing the granular composition and the release of the active silicon-containing ingredients upon addition of water to the dry mix composition. The silicon-containing (ii) granular composition in accordance with the present invention makes up from 0.05 to 0.55 wt. % of the dry mix composition. And the total amount of the polydiorganosiloxane and the hydrolysable silane together make up from 0.005 to 0.22 wt. %, or, preferably, from 0.007 to 0.1 wt. % of the dry mix composition in accordance with the present invention.

In accordance with the present invention, the storage stable powder composition comprises:

(i) a water redispersible polymer powder (RDP), such as an RDP containing an ethylene-vinyl acetate (VaE) copolymer, acrylate copolymer, or styrene acrylate copolymer, preferably, a VaE copolymer that does not contain, in copolymerized form, monomers containing a $C_4$ or higher alkyl group, such as a VaE copolymer that does not contain, in copolymerized form, monomers other than ethylene and vinyl acetate; and, (ii) a granular composition of (a) a silicate carrier, such as a zeolite or an aluminum silicate, such as sodium aluminum silicate, (b) a polydiorganosiloxane, preferably a poly(dimethylsiloxane) or a poly(diethylsiloxane), (c) a hydrolysable silane containing a $C_4$ to $C_{12}$ alkyl group, or an oligomer thereof, preferably, a $C_6$ to $C_9$ alkyl group, or, more preferably, an octyltrialkoxysilane, and (d) a polymer encapsulant for the hydrolysable silane and polydiorganosiloxane, preferably, a polyvinyl alcohol, wherein the weight ratio of the total RDP to the total granular composition ranges from 90:10 to 98:2. Suitable dry mix compositions comprise from 0.5 to 5.5 wt. %, or, preferably, from 1 to 5 wt. % of the combination of the (i) RDP and the (ii) granular composition.

Further, in accordance with the present invention, the storage stable powder composition comprises as the (ii) granular composition (a) from 54 to 89 wt. % or, preferably, from 69 to 85 wt. % of the silicate carrier, (b) from 4 to 15 wt. % or, preferably, from 6 to 12 wt. % of the polydiorganosiloxane, (c) from 6.5 to 25 wt. % or, preferably, from 8 to 15 wt. % of the hydrolysable silane, and (d) from 0.5 to 6 wt. % or, preferably, from 1 to 4 wt. % of the polymer encapsulant for the hydrolysable silane and polydiorganosiloxane. All weight proportions in the granular composition are based on the total weight of the granular composition and add up to 100%.

Still further, the (b) polydiorganosiloxane in the (ii) granular composition in accordance with the present invention has a room temperature viscosity in neat form of from 40 to 500 mPa·s, or, preferably, from 50 to 100 mPa·s, or, more preferably, from 60 to 80 mPa·s.

Yet still further, at least one (b) polydiorganosiloxane in the (ii) granular composition in accordance with the present invention is a hydroxyl terminal polydi($C_1$ to $C_2$ alkyl) siloxane, such as hydroxy-terminated polydimethylsiloxane.

Yet even still further, the (c) hydrolysable silane in the (ii) granular composition in accordance with the present invention, is an n-octyltriethoxysilane, an n-octyl trimethoxysilane or an oligomer thereof.

Yet even more further still, the storage stable powder composition in accordance with the present invention comprises from 0.15 to 0.75 wt. %, or, preferably, from 0.20 to 0.5 wt. %, or, more preferably, from 0.35 to 0.45 wt. % of one or more cellulose ethers. Preferably, at least one of the one or more cellulose ethers is chosen from a non-mixed cellulose ether that contains alkyl ether groups, or a mixed cellulose ether that contains hydroxyalkyl groups and alkyl ether groups, such as those chosen from alkyl hydroxyethyl celluloses, e.g. hydroxyalkyl methylcelluloses, and is, more preferably, chosen from hydroxyethyl methylcellulose (HEMC), hydroxypropyl methylcellulose (HPMC), methyl hydroxyethyl hydroxypropylcellulose (MHEHPC), methyl ethyl hydroxyethyl cellulose (MEHEC) and ethylhydroxyethyl cellulose (EHEC), or, even more preferably, HEMC.

Preferably, the storage stable powder composition in accordance with the present invention comprises cement and, when mixed with water in accordance with EN 12004:2 (2017) at 25° C. to a viscosity of 400 to 650 Pa·s, forms a cement-based tile adhesive that exhibits a tensile strength as determined according to EN 1348 of at least 1 N/mm$^2$, such as at least 1.3 N/mm$^2$ after each of (i) 28 day aging at 23° C.±2° C. and standard (101.3 kPa) pressure, (ii) 7 days plus 7 hours aging at 23° C.±2° C. and standard (101.3 kPa) pressure and 20 days plus 17 hours water immersion at 23° C.±2° C. and standard (101.3 kPa) pressure, and (iii) 14 day aging at 23° C.±2° C. and standard (101.3 kPa) pressure and then 70° C. heat aging for 14 days.

More preferably, the storage stable powder composition in accordance with the present invention comprises cement and sand, one or more fillers or combinations thereof and, when mixed with water in accordance with EN 12004:2 (2017) at 25° C. to a viscosity of 400 to 650 Pa·s forms a cement-based tile adhesive that exhibits an open time as determined in accordance with EN 1346 of at least 0.5 N/mm$^2$, such as at least 0.9 N/mm$^2$ 20 min after embedding the tile adhesive on a substrate, or, preferably, 30 minutes after embedding the tile adhesive on a substrate.

Even more preferably, the storage stable powder composition in accordance with the present invention comprises cement and sand, one or more fillers or combinations thereof, and, when mixed with water in accordance with EN 12004:2 (2017) at 25° C. to a viscosity of 400 to 650 Pa·s forms a cement-based tile adhesive that exhibits a tensile strength as determined according to EN 1348 of at least 1 N/mm$^2$, or at least 1.3 N/mm$^2$ after each of (i) 28 day aging at 23° C.±2° C. and standard (101.3 kPa) pressure, (ii) 7 days plus 7 hours aging at 23° C.±2° C. and standard (101.3 kPa) pressure and 20 days plus 17 hours water immersion at 23° C.±2° C. and standard (101.3 kPa) pressure, and (iii) 14 day aging at 23° C.±2° C. and standard (101.3 kPa) pressure and then 70° C. heat aging for 14 days; and, further, the powder composition in accordance the present invention enables the provision of a cement-based tile adhesive that exhibits an open time as determined in accordance with EN 1346 of at least 0.5 N/mm$^2$, or at least 0.9 N/mm$^2$ 20 min after embedding the tile adhesive on a substrate, or, preferably, 30 minutes after embedding the tile adhesive on a substrate. An example of a suitable (ii) granular composition is a three-component granule, consisting of (a) the silicate carrier, (b) the polydiorganosiloxane, (c) the hydrolysable silane, and (d) the polymer encapsulant for the hydrolysable silane and polydiorganosiloxane. The encapsulant provides storage stability in the powdered composition and the release of the active ingredient upon addition of water.

The (a) silicate carrier in accordance with the present invention may be water-insoluble or water-dispersible. Suitable examples of carrier particles include, for example, aluminosilicates (such as zeolite or metakaolin), clay, or sand. The silicate carrier may have a mean diameter (×50 as determined by light scattering) of from 0.1 to 5000 μm, or, preferably from 0.2 to 1000 μm, or, more preferably, from 0.2 to 50 μm. A smaller particle size silicate carrier enables use of less encapsulant polymer to fully encapsulate the remaining materials in the granular composition.

The (b) polyorganosiloxane in accordance with the present invention has a viscosity that enables storage stability and facilitates processing. The polyorganosiloxane can be a linear polymer or can contain a small proportion, such as 5% or less of repeat units, of branching. Such branching can result from the presence of hydrolyzable or silanol end groups in the polyorganosiloxane which is then oligomerized.

The (c) hydrolysable silane in accordance with the present invention may comprise an oligomer formed by partial hydrolysis of an alkoxy silane or another hydrolysable silane containing a $C_4$ to $C_{12}$ alkyl group and may comprise the condensation product of a partially hydrolysed trialkoxysilane, such as n-octyl trimethoxysilane or n-octyl triethoxysilane. The $C_4$ to $C_{12}$ alkyl group in the hydrolysable silane is large enough so that it does not volatilize in processing, storage or use and small enough so that it is not waxy or soft in or after use.

The partial hydrolysis can be effected by addition of a small portion (0.0001 to 0.05 moles per mole of the silane) of aqueous base, such as caustic, or acid, e.g. an organic acid having a pKa lower than 4, such as formic acid, followed by quenching to neutralize the pH. The (d) polymer encapsulant may be, for example, a metastable emulsion polymer, such as an acrylic emulsion polymer having up to 5 wt. % of repeat units that comprise a carboxylate group, or a colloidal stabilizer which is itself dispersible in water, such as a poly(vinyl alcohol). The amounts of the polymer encapsulant are such that it encapsulates both (b) the polydiorganosiloxane and (c) the hydrolysable silane, without there being so much of the encapsulant that the resulting granules would not contain all the materials in the (ii) granular composition, including the silicate carrier.

The (ii) granular composition may be formed from an aqueous dispersion or emulsion wherein the (b) polydiorganosiloxane and the (c) hydrolysable silane are granulated in a manner known to the ordinary skilled artisan. Such methods are disclosed, for example, in U.S. Pat. No. 8,445,560B2 to Lecomte et al, EP 0811584 to Dow Silicones UK Ltd., or EP 496510 to Dow Silicones Belgium SPRL. In the granulation process, the (b) polydiorganosiloxane and the (c) hydrolysable silane are emulsified or at least dispersed in the aqueous medium or emulsion of the (d) polymer encapsulant for the hydrolysable silane and polydiorganosiloxane. Such dispersion can be effected by using of an in line or static mixer. The resultant silane and polysiloxane dispersion or emulsion composition is deposited in a liquid form, for example by spraying, onto the (a) silicate carrier e.g. in a fluid bed, thus causing the admixture to solidify through the evaporation of water onto the carrier and thereby forming a free flowing powder.

In another suitable granulation method, the emulsion of the (b) polydiorganosiloxane, the (c) hydrolysable silane and the (d) polymer encapsulant are sprayed simultaneously into a drum mixer containing the (a) silicate carrier. The spray droplets partially evaporate on contact with the silicate carrier particles, after which the resulting particles are transferred to a fluidized bed where evaporation is completed with ambient air. The (ii) granular composition is then collected from the fluidized bed. Typical apparati useful for granulation may include an Eirich™ pan granulator, a Schugi™ mixer, a Paxeson-Kelly™ twin-core blender, a Lödige™ ploughshare mixer, a Lödige™ continuous ring layer mixer, or one of the numerous types of fluidised bed apparati, e.g. an Aeromatic™ fluidised bed granulator. The resulting granules may be further screened by sieving to produce particles of a granular composition of substantially free of any undersized or oversized material.

In yet another suitable method, the (a) silicate is injected into an aqueous dispersion of the (b) polydiorganosiloxane, the (c) hydrolysable silane and the (d) polymer encapsulant while under agitation, followed by drying and granulating the resulting mixture.

The storage stable powder compositions of the present invention comprise at least one (i) a water redispersible polymer powder (RDP). RDPs may be formed in a conventional manner by spray drying an emulsion polymer binder formed by conventional aqueous emulsion polymerization. Aqueous emulsion polymers may be selected from various compositional classes such as, for example, vinyl acetate polymers, vinyl acetate-acrylic copolymers, vinyl acetate-ethylene copolymers, acrylic polymers, styrene-acrylic polymers, styrene-butadiene copolymers, and blends thereof. RDP compositions further include anticaking agents such as clays and colloidal stabilizers, such as poly(vinyl-alcohol), which enable spray drying to form affinely divided powder. RDPs may improve adhesion and durability of the skim coat mortar. Suitable emulsion polymers may have a glass transition temperature (Tg) of at least −30° C. or up to or less than 20° C., or, preferably, at least −15° C., or, preferably, up to 15° C. or, more preferably, at least −10° C. If the Tg is too high for use in cement compositions, end use properties may suffer, such as flexibility, e.g. in cold temperatures, and crack bridging. The Tg of the copolymers can be determined in a known manner by differential scanning calorimetry (DSC). Suitable RDP compositions in accordance with the present invention include the product of drying a combination of a water insoluble film-forming polymer, a colloidal stabilizer for colloidal stabilization and a finely divided anticaking agent, such as a clay, for example, kaolin. Conventional colloidal stabilizers, such as polyvinyl alcohol (PVOH) may be employed as a colloidal stabilizer in conventional amounts. Preferred polyvinyl alcohols for use herein are partially hydrolyzed polyvinyl alcohols. The amount of PVOH or other known colloidal stabilizers employed to achieve colloidal stability may be at least 1 wt. %, for example from 2 to 30 wt. %, or, preferably from 5 to 20 wt. %, based upon the weight of the water insoluble film-forming polymer. Suitable anticaking agents may be such as kaolin, calcium carbonates or silicates. The amount of the anticaking agent may be up to 40% by weight, based upon the weight of the resulting water redispersible polymer powder (RDP).

In accordance with the present invention, the water redispersible polymer powder (RDP) composition may be produced by drying an aqueous mixture of the water insoluble film-forming polymer and the colloidal stabilizer while introducing the anticaking agent into the stream of the aqueous mixture. Such drying may be carried out in a conventional manner with known polymer compositions, such as in the manner set forth, for example, in US patent publication no. US 2010/0240819 A1, to Perello et al., or, U.S. Pat. No. 9,181,130 B2, to Dombrowksi et al. Thus, the drying may comprise spray drying the polymer, the colloidal stabilizer, or both together, and the anticaking agent as co-fed streams. For example, an aqueous dispersion of the water insoluble film-forming polymer may be provided by emulsion polymerization, and the colloidal stabilizer may be admixed with the aqueous dispersion after polymerization, and then the aqueous dispersion may be spray dried while adding the anticaking agent to obtain the water redispersible polymer powder. In one example, the viscosity of the feed to be spray-dried may be adjusted via the solids content so that a value of less than 1000 mPa·S (Brookfield viscosity at 20 revolutions and 23° C.), preferably less than 250 mPa·S, is obtained. The solids content of the dispersion to be spray-dried may generally be from 25 to 75 wt. %, for example, from 35 to 65 wt. %, preferably from 40 to 60 wt. %, based on the total weight of the dispersion. Spray drying can be carried out in customary spray drying plants, with atomization being carried out by means of single-fluid, two-fluid or multifluid nozzles or a rotary disc atomizer. In general, air, nitrogen or nitrogen enriched air may be employed as the drying gas, with the inlet temperature of the drying gas generally not exceeding 200° C., or, preferably, from 110° C. to 180° C., or, more preferably from 130° C. to 170° C. The outlet temperature may generally be from 45° C. to 120° C., or, preferably from 60° C. to 90° C., depending on the plant, the glass transition temperature of the polymeric composition and the desired degree of drying.

Suitable cellulose ethers for use in the powders, dry mixes and cement-based tile adhesives in accordance with the present invention may include, for example, a hydroxyalkyl cellulose, an alkyl cellulose, or a mixture of such cellulose ethers. Examples of cellulose ether compounds suitable for use in the present invention include, for example, methylcellulose (MC), ethyl cellulose, propyl cellulose, butyl cellulose, hydroxyethyl methylcellulose (HEMC), hydroxypropyl methylcellulose (HPMC), hydroxyethyl cellulose ("HEC"), ethylhydroxyethylcellulose (EHEC), methylethylhydroxyethylcellulose (MEHEC), hydrophobically modified ethylhydroxyethylcelluloses (HMEHEC), hydrophobically modified hydroxyethylcelluloses (HMHEC), sulfoethyl methylhydroxyethylcelluloses (SEMHEC), sulfoethyl methylhydroxypropylcelluloses (SEMHPC), and sulfoethyl hydroxyethylcelluloses (SEHEC). Preferably, the cellulose ethers are mixed cellulose ethers that contain hydroxyalkyl groups and alkyl ether groups, such as alkyl hydroxyethyl celluloses, such as hydroxyalkyl methylcelluloses, for example, hydroxyethyl methylcellulose (HEMC), hydroxypropyl methylcellulose (HPMC), methyl hydroxyethyl hydroxypropylcellulose (MHEHPC), methyl hydroxyethylcellulose (MEHEC), and ethylhydroxyethyl cellulose (EHEC).

In the cellulose ethers in accordance with the present invention, alkyl substitution is described in cellulose ether chemistry by the term "DS". The DS is the mean number of substituted OH groups per anhydroglucose unit. The methyl substitution may be reported, for example, as DS (methyl) or DS (M). The hydroxy alkyl substitution is described by the term "MS". The MS is the mean number of moles of etherification reagent which are bound as ether per mol of anhydroglucose unit. Etherification with the etherification reagent ethylene oxide is reported, for example, as MS (hydroxyethyl) or MS (HE). Etherification with the etherification reagent propylene oxide is correspondingly reported as MS (hydroxypropyl) or MS (HP). The side groups are determined using the Zeisel method (reference: G. Bartelmus and R. Ketterer, Fresenius *Zeitschrift fuer Analytische Chemie* 286 (1977), 161-190).

A suitable cellulose ether preferably has a degree of hydroxyalkyl substitution MS (HE) of 1.5 to 4.5, or, more preferably, a degree of substitution MS (HE) of 2.0 to 3.0. Preferably, mixed ethers of methyl cellulose are used such as HEMC having methyl substitution DS (M) values ranges from 1.2 to 2.1 or, more preferably, from 1.3 to 1.7, or, even more preferably, from 1.35 to 1.65, and hydroxyalkyl substitution MS (HE) values range from 0.05 to 0.75, or, more preferably, from 0.10 to 0.45, or, even more preferably, 0.15 to 0.40. In the case of HPMC, preferably, DS (M) values range from 1.2 to 2.1, or, more preferably, from 1.3 to 2.0 and MS (HP) values range from 0.1 to 1.5, or, more preferably, from 0.15 to 1.2.

The storage stable powder compositions in accordance with the present invention suitable for use as a dry mix may further comprise a finely divided cement, such as a hydraulic cement powder. Suitable examples of cements are ordinary portland cement. Dry cements may be used in amounts of from 15 to 33 wt. %, or, preferably, from 18 to 30 wt. %, based on the total weight of dry mix.

The storage stable powder compositions in accordance with the present invention suitable for use as a dry mix may further comprise from 59.5 to 84.5 wt. %, or, preferably, from 65 to 81 wt. % of sand, one or more fillers or both. Suitable fillers may be chosen from alkali carbonates and silicates, as well as calcined, sintered or ceramic forms thereof, such as dolomite, kaolinite, calcium carbonate, such as crushed calcium carbonate, magnesium carbonate, talc, silica sand, white silica sand, or alkali metal silicates, such as calcium silicate, sodium silicate or their mixtures. Suitable particle sizes for the sand or fillers may range from a sieve average particle size (determined by a LAVIB sieve machine, Siebtechnik, Muelheim, DE) of 100%<0.8 mm or less, such as from 80 microns to less than 0.8 mm, or, preferably, 100%<0.5 mm or less.

The storage stable powder compositions of the present invention suitable for use as a dry mix may comprise up to 1 wt. % of any one or more additional ingredients in dry form such as accelerators, such as calcium formate, superplasticizers, additional organic or inorganic thickening agents and/or secondary water retention agents, anti-sag agents, wetting agents, defoamers, dispersants, water repellents, biopolymers, or fibres. All of the additional ingredients are known in the art and are commercially available. All additional ingredients are known in the art and are available from commercial sources.

A suitable storage stable powder composition suitable for use as a cement-based tile adhesive dry mix composition in accordance with the present invention may further comprise from 0.010 to 0.050 wt. % of total solids of a starch ether or a poly(meth)acrylamide slip aid, and at least 0.1 wt. % of total solids of a cellulose ether. The storage stable powder compositions are formed by mixing all of the materials of the present invention in dry form. The powder compositions can be stored for later use. Cementitious compositions are generally used as a dry mix powder by adding water thereto and mixing to form a cement-based tile adhesive. Cementitious tile adhesives compositions can be sold as a dry mix powder.

In accordance with the present invention, the methods of using the storage stable powder compositions comprise combining them as a dry mix with water to form a cement-based tile adhesive mortar, optionally wetting a substate, applying the adhesive to the substrate to form an adhesive bearing substrate, and then applying a tile to the adhesive bearing substrate. Cement-based tile adhesive mortar may be applied on porous substrates such as gypsum, wood, plywood, backer board, concrete or cement renders.

The compositions of the present invention find use as cement-based tile adhesives for use with ceramic tiles, especially heavy or large tiles which require stronger adhesives. Further, the compositions of the present invention find use in heat resistant or underwater applications, such as in tunnels, pools, and in exterior applications.

The present invention provides for the following features:

1. In accordance with the present invention storage stable powder compositions for use as dry mixes for making cement-based tile adhesive mortars comprise from 15 to 33 wt. %, or, preferably, from 18 to 30 wt. % of a cement, such as ordinary portland cement, from 65 to 83 wt. %, or, preferably, from 68 to 80 wt. % of one or more of sand, one or more fillers chosen from dolomite, kaolinite, calcium carbonate, talc, silica sand, white silica sand, alkali metal silicates, or mixtures thereof, and, from 0.5 to 5.5 wt. %, or, preferably, from 1 to 5 wt. % of a mixture of (i) one or more water redispersible polymer powders (RDP), such as ethylene-vinyl acetate (VaE), and (ii) a granular composition of a water dispersible polymer encapsulated polydiorganosiloxane and a hydrolysable silane having a $C_4$ to $C_{12}$ alkyl group, all amounts being wt. % of total solids in the dry mix composition and all proportions adding up to 100%, wherein the weight ratio of the total (i) water redispersible polymer powder (RDP) to the total (ii) granular composition ranges from 90:10 to 98:2.

2. The storage stable powder composition as set forth in clause 1, above, wherein at least one i) water redispersible polymer powder (RDP) in the powder composition comprises an ethylene-vinyl acetate (VaE) copolymer, acrylate copolymer, or styrene acrylate copolymer, or, preferably, a VaE copolymer that does not contain, in copolymerized form, monomers containing a $C_4$ or higher alkyl group.

3. The storage stable powder composition as set forth in any one of clauses 1 or 2, above, wherein the (ii) granular composition comprises (a) a silicate carrier, such as a zeolite or an aluminum silicate, such as sodium aluminum silicate, calcium silicate or sodium silicate, and mixtures thereof, (b)

a polydiorganosiloxane, (c) a hydrolysable silane containing a $C_4$ to $C_{12}$ alkyl group, or an oligomer thereof, preferably, a $C_6$ to $C_9$ alkyl group, or, more preferably, an octyltrialkoxysilane, and (d) a polymer encapsulant for the hydrolysable silane and polydiorganosiloxane, preferably, a polyvinyl alcohol.

4. The storage stable powder composition as set forth in any one of clauses 1, 2, or 3, above, wherein the (ii) granular composition comprises (a) from 54 to 89 wt. % or, preferably, from 69 to 85 wt. % of the silicate carrier, (b) from 4 to 15 wt. % or, preferably, from 6 to 12 wt. % of the polydiorganosiloxane, (c) from 6.5 to 25 wt. % or, preferably, from 8 to 15 wt. % of the hydrolysable silane, and (d) from 0.5 to 6 wt. % or, preferably, from 1 to 4 wt. % of the polymer encapsulant for the hydrolysable silane and polydiorganosiloxane, all weight proportions in the granular composition adding up to 100%.

5. The storage stable powder composition as set forth in any one of clauses 1, 2, 3 or 4, above, further comprising from 0.15 to 0.75 wt. %, or, preferably, from 0.20 to 0.5 wt. %, or, more preferably, from 0.35 to 0.45 wt. % of one or more cellulose ethers, preferably, hydroxyethyl methylcellulose.

6. The storage stable powder composition of any one of items 1, 2, 3, 4, or 5, above, wherein the sand or filler has a sieve average particle size of 100% of particles having a sieve average particle size of from 80 microns to less than 0.8 mm, or, preferably, 100% of particles having a sieve average particle size of from 0.1 to 0.5 mm, for example, as determined by a LAVIB sieve machine, Siebtechnik, Muelheim, DE.

7. The storage stable powder composition of any one of items 1, 2, 3, 4, 5, or 6, above, that when mixed with water in accordance with EN 12004:2 (2017) at 25° C. to a viscosity of 400 to 650 Pa·s exhibits a tensile strength as determined according to EN 1348 of at least 1 N/mm$^2$, or preferably, at least 1.3 N/mm$^2$ after each of (i) 28 day aging at 23° C.±2° C. and standard (101.3 kPa) pressure, (ii) 7 days plus 7 hours aging at 23° C.±2° C. and standard (101.3 kPa) pressure and 20 days plus 17 hours water immersion at 23° C.±2° C. and standard (101.3 kPa) pressure, and (iii) 14 day aging at 23° C.±2° C. and standard (101.3 kPa) pressure and then 70° C. heat aging for 14 days.

8. The storage stable powder composition of any one of items 1, 2, 3, 4, 5, 6, or 7, above, that when mixed with water in accordance with EN 12004:2 (2017) at 25° C. to a viscosity of 400 to 650 Pa·s exhibits an open time as determined in accordance with EN 1346 of at least 0.5 N/mm$^2$ 20 min after embedding the tile adhesive on a substrate, or, preferably, 30 minutes after embedding the tile adhesive on a substrate.

9. The storage stable powder composition of any one of items 1, 2, 3, 4, 5, 6, 7, or 8, above, that when mixed with water in accordance with EN 12004:2 (2017) at 25° C. to a viscosity of 400 to 650 Pa·s exhibits an open time as determined in accordance with EN 1346 of at least 0.9 N/mm$^2$ 20 min after embedding the tile adhesive on a substrate, or, preferably, 30 minutes after embedding the tile adhesive on a substrate.

10. The storage stable powder composition of any one of items 1, 2, 3, 4, 5, 6, 7, 8, or 9, above, that when mixed with water in accordance with EN 12004:2 (2017) at 25° C. to a viscosity of 400 to 650 Pa·s exhibits a slip resistance as determined in accordance with EN 1308 of lower than 0.5 mm.

11. In another aspect of the present invention, the present invention provides methods of using the storage stable powder compositions of any one of items 1 to 10, above, comprising mixing the powder composition with water to form a cement-based tile adhesive, applying the adhesive to a porous substrate to form an adhesive bearing substrate, and then applying a tile to the adhesive bearing substrate.

Examples

The following examples illustrate the present invention. Unless otherwise indicated, all parts and percentages are by weight and all temperatures are in ° C. Unless otherwise indicated all conditions are 23° C.±2° C., 50%±5% relative humidity (rh) and an air movement of <0.2 m/s. As used in the Examples, the term "standard conditions" refers to room temperature (23° C.±2° C.) and standard pressure (101.3 kPa).

In the examples and Tables 1, 2, 3, 4, 5 and 6 that follow, the following abbreviations were used: PDMS: Poly(dimethylsiloxane); PVOH: poly(vinyl alcohol); RDP: Redispersible Polymer Powder; VaE: Vinyl acetate Ethylene.

In the examples that follow, the following materials were used:

RDP 1: DLP 2000 Redispersible Latex Powder (Dow, Midland, MI (Dow)) is a free-flowing, white powder obtained by spray drying an aqueous vinyl acetate ethylene (VaE) copolymer dispersion in the presence of a kaolin anticaking agent and a colloidal stabilizer;

RDP 2: VINNAPAS™ 8118 E RDP, polymer of vinyl acetate/vinyl chloride/ethylene with colloidal stabilizer, Wacker Chemie, AG, Munich, DE (Wacker);

RDP 3: VINNAPAS™ 7220E RDP, polymer of vinyl acetate/vinyl versatate (VeoVa), ethylene and acrylic acid ester and colloidal stabilizer (Wacker);

RDP 4: Powder from polymer of 40 wt. % of VeoVa 60 wt. % of VaE, with 12 wt. % of PVOH as colloidal stabilizer and 15 wt. % of Kaolin as anticaking agent.

Granular composition: 77 wt. % of a powder carrier (zeolite); 10 wt. % silanol terminated polydimethyl siloxane (neat viscosity ~60 mPa·s at 25° C.); 10 wt. % n-octytriethoxysilane; 3 wt. % PVOH.

Hydrophobic Additive: Hydroxyl functional polydimethylsiloxane fluid aqueous emulsion (60 to 80 mPa*s as neat polymer at 25° C.);

Water resistant silane emulsion: Aqueous emulsion containing n-octyltriethoxy silane;

Cement: Ordinary portland cement (OPC CEM 42.5);

Sand: finely divided sand, 0.09-0.5 mm in mean (×50) diameter;

Fine sand: Quartz sand F36 (Quarzwerke Frechen, manufacturer reported mean particle size (×50) 160 μm, specific surface area 144 cm$^2$/g);

Medium sand: Quartz sand F32 (Quarzwerke Frechen, manufacturer reported mean particle size (×50) 240 μm, specific surface area 102 cm$^2$/g) Cellulose Ether 1: Hydroxyethyl methyl cellulose (HEMC, DS (Methyl) =1.55 to 1.65; MS (hydroxyethyl)=0.25 to 0.32; viscosity 50,000 to 58,000 mPa s, 2 wt. % aq. Solution, Haake™ Viscotester™ VT550, shear rate 2.55 s-1, 20° C. (Dow)).

Cement-based tile adhesives having the indicated compositions as set forth in Tables 1, 2 and 3, below were tested and characterized as discussed below.

TABLE 1

Cement-Based Tile Adhesive Formulations

| Material | Example 1* | 2* | 3 | 4* | 5* |
|---|---|---|---|---|---|
| | Amount (wt. %) | | | | |
| Cement | 30.00 | 30.00 | 30.00 | 30.00 | 30.00 |
| Sand | 67.70 | 67.70 | 67.20 | 67.55 | 67.66 |
| RDP 1 | 2.00 | | 2.00 | 2.00 | 2.00 |
| RDP 2 | | 2.00 | | | |
| Cellulose Ether 1 | 0.30 | 0.30 | 0.30 | 0.30 | 0.30 |
| Granular composition | | | 0.50 | | |
| Water resistant silane emulsion | | | | 0.15 | |
| Hydrophobic Additive | | | | | 0.04 |
| TOTAL | 100.00 | 100.00 | 100.00 | 100.00 | 100.00 |

*Denotes Comparative Example.

As shown in Table 1, above, the amount of active silane content (triethoxy(octyl)silane) in the composition is 1.6 times higher in Comparative Example 4 than in Example 3.

The amount of active content (PDMS) in the composition is half the amount in Comparative Example 5 as in Example 3.

TABLE 2

Cement-Based Tile Adhesive Formulations With Various Amounts of the Granular Composition

| Material | Example 6* | 7* | 8 | 9 | 10 | 11* |
|---|---|---|---|---|---|---|
| | Amount (wt. %) | | | | | |
| Cement | 35.00 | 35.00 | 35.00 | 35.00 | 35.00 | 35.00 |
| Quartz sand 1 | 30.60 | 30.60 | 30.60 | 30.60 | 30.60 | 30.60 |
| Quartz sand 2 | 31.00 | 31.00 | 31.00 | 31.00 | 31.00 | 31.00 |

TABLE 2-continued

Cement-Based Tile Adhesive Formulations With Various Amounts of the Granular Composition

| Material | Example 6* | 7* | 8 | 9 | 10 | 11* |
|---|---|---|---|---|---|---|
| | Amount (wt. %) | | | | | |
| RDP 1 | | 3.00 | 2.97 | 2.94 | 2.86 | 2.94 |
| RDP 2 | 3.00 | | | | | |
| Granular composition | | | 0.03 | 0.06 | 0.14 | |
| Water resistant silane emulsion | | | | | | 0.06 |
| Cellulose ether 1 | 0.40 | 0.40 | 0.40 | 0.40 | 0.40 | 0.40 |
| TOTAL | 100.00 | 100.00 | 100.00 | 100.00 | 100.00 | 100.00 |

*Denotes Comparative Example

TABLE 3

Cement-Based Tile Adhesive Formulations With Various RDPs

| Material | Example 11* | 12* | 13 | 14* | 15* | 16 | 17* | 18* | 19 | 20* | 21* |
|---|---|---|---|---|---|---|---|---|---|---|---|
| | Amount (wt. %) | | | | | | | | | | |
| Cement | 35.00 | 35.00 | 35.00 | 35.00 | 35.00 | 35.00 | 35.00 | 35.00 | 35.00 | 35.00 | 35.00 |
| Fine sand | 30.60 | 30.60 | 30.60 | 30.60 | 30.60 | 30.60 | 30.60 | 30.60 | 30.60 | 30.60 | 30.60 |
| Medium sand | 31.00 | 31.00 | 31.00 | 33.00 | 33.00 | 33.00 | 29.00 | 29.00 | 29.00 | 29.00 | 29.00 |
| Granular composition | | | 0.14 | | | 0.5 | | | 0.25 | | |
| RDP 1 | | 3.00 | 2.86 | | 1.00 | 0.95 | | 5.00 | 4.75 | | |
| RDP 2 | 3.00 | | | 1.00 | | | 5.00 | | | | |
| RDP 3 | | | | | | | | | | | 5.00 |
| RDP 4 | | | | | | | | | | 5.00 | |
| Cellulose ether 1 | 0.40 | 0.40 | 0.40 | 0.40 | 0.40 | 0.40 | 0.40 | 0.40 | 0.40 | 0.40 | 0.40 |
| TOTAL | 100.00 | 100.00 | 100.00 | 100.00 | 100.00 | 100.00 | 100.00 | 100.00 | 100.00 | 100.00 | 100.00 |

*Denotes Comparative Example

Unless otherwise indicated below, dry mix compositions were formed by weighing the indicated ingredients in Tables 1, 2 and 3, above, as individual raw materials carefully on an electronic balance, dry blending them as powders and letting them rest for from 17 to 24 hours. The dry mix compositions were then tested as indicated, below.

Unless otherwise indicated, wet cement-based tile adhesives were formed in accordance with EN 12004:2 (2017) by taking a 1500 g amount of the indicated dry mix composition and combining it with water using a Hobart 5-Quart Mixer (Hobart, Troy, Ohio, USA) for 30 s at speed 1 in a container; scraping the container sides and the mixing blade with a scraper while allowing the mixture to rest for 1 minute; mixing further for 1 minute at speed 1; scraping the sides of the container and the mixing blades again while letting the mixture sit for 10 minutes; and then mixing again for 15 s at speed 1 in accordance with EN 196-1, section 4.4. Open Time was determined in accordance with EN 1346. In the test, Group BIII porous earthenware tiles (5×5 cm, thickness of 7 to 10 mm, and a profile back pattern of less than 0.25 mm deep, (Deutsche Steinzeug Cremer & Breuer AG, Alfter-Witterschlick, DE),) having a water absorbing capacity of 14.4±3% by mass in accordance with EN 14411 were used. The test substrate was a 40×20 cm gypsum plaster board, (Rigips VARIO™ 12.5). In the test, tiled substrates were prepared by applying a thin layer of the indicated tile adhesive to the test substrate using a straight edge trowel, followed by applying a second layer of the tile adhesive and combing in a straight line in a direction parallel to the side of the substrate using a notched trowel having 4 mm×4 mm notches at 8 mm intervals and holding the trowel at an angle of approximately 60° to the substrate. A stop watch was set to zero and started. At 5-minute intervals after the adhesive is embedded on the substrate, i.e. after each of 5, 10, 15, 20, 25 and 30 minutes, each tile was laid on the bed of the indicated tile adhesive at least 50 mm apart from any other tile and was weighed down with a 3 kg weight for 30 s. The interval period was recorded and the adhered tiles were aged in the indicated conditions, described below under tensile adhesion testing. Open time in accordance with EN 1346 or open time adhesion refers to the amount of force in $N/mm^2$ it takes to pull the tiles adhered after the given interval period off of the substrate after storage under the indicated conditions. Thus a 30-minute open time under 28 day standard conditions refers to a test in which the tile was laid in an adhesive bed 30 minutes after the adhesive was applied to a base, and that the tile and base were aged for 28 days under standard conditions prior to tensile testing. More force needed to remove tiles embedded after a longer interval means that the adhesive remained wet after the end of the interval. All results were reported as the average of ten (10) tiles tested.

Tensile Adhesion was determined in accordance with EN 1348 after mixing. Group B1a fully vitrified unglazed stoneware tiles in accordance with ISO 13006 (50±1 mm×50±1 mm, Winckelmans, Lomme, FR) with a plain, matt, adhering surface and having a water absorption of ≤0.5% by mass were used. The rectangular concrete test substrate (40±5 mm thick) had a moisture content of <3% by mass, and a surface water absorption of from 0.5 $cm^3$ to 1.5 $cm^3$ after 4 hr at room temperature. The tensile tester was a direct pull tensile tester capable of applying a load to a pull-head plate at the rate of 250±50 N/s through a suitable fitting that does not exert any bending force, equipped with a connecter for square metallic (50±1 mm×50±1 mm) pull-head plates, at least 10 mm thick and having a suitable fitting for connection to the test machine. The air circulating oven was capable of controlling the temperature to within ±3° C. In the test, tiled substrates were prepared by applying a thin layer of the indicated tile adhesive to the test substrate using a straight edge trowel, followed by applying a second layer of the tile adhesive and combing in a straight line in a direction parallel to the side of the substrate using a notched trowel having 6 mm×6 mm notches at 12 mm intervals and holding the trowel at an angle of approximately 60° to the substrate. After allowing the applied adhesive to sit for 5 min, for each test, 10 type B1a tiles were placed on the adhesive at a distance of 50 mm apart and each tile was loaded with a force of 20±0.05 N for 30 s to form a tiled substrate. Pull head plates were bonded to the tiles on the tiled substrates using an epoxy adhesive (Körapox™ 558 epoxy adhesive, Koemmerling Chemische Fabrik GmbH, Pirmasens, DE). All results were reported as the average of ten (10) tiles tested in $N/mm^2$. To test tensile adhesion strength under standard conditions (28 day), the tiled substrate was stored for 27 d under standard conditions, and then the pull-head plates were bonded to the tiles. After a further 24 h storage under standard conditions, the tensile adhesion strength of the adhesive was determined by applying a force at a constant rate of 250±50 N/s. The Open Time Adhesion refers to the same tensile adhesion strength under 28 day standard conditions when the tiles are placed on the bed of adhesive after an indicated time interval, indicating the ability of the adhesive to work after sitting out for the time interval. To test fast setting tensile adhesion properties of adhesives, the pull-head plates were bonded to the tiles in the tiled substrates for a minimum of 2 h before determining the tensile adhesion strength. To test tensile adhesion strength after water immersion, the tiled substrates were conditioned under standard conditions for 7 d and immersed in water under standard conditions for 20 d. After 20 d, the tiled substrates were removed from the water, wiped with a cloth, and the pull-head plates were bonded to the tiles. After a further 7 h storage under standard conditions, the tiled substrates were immersed in water under standard conditions for 17 more hours. At the end of the 17 hours, the tiled substrates were removed the from the water and immediately tested for tensile adhesion strength of the adhesive by applying a force at a constant rate of 250±50 N/s. To test tensile adhesion strength after heat aging, the tiled substrates were conditioned under standard conditions for 14 d and then placed in the air-circulating oven at 70±3° C. for a further 14 d. Then, the tiled substrates were removed from the oven and the pull-head plates bonded to the tiles. The tiled substrates were then conditioned for a further 24 h under standard conditions and then tensile adhesion strength was determined by applying a force at a constant rate of 250±50 N/s.

Slip Resistance or Slip was determined in accordance with EN 1308. After mixing in accordance with EN 12004:2 (2017) at 25° C. to a viscosity of 400 to 650 Pa·s, the indicated freshly mixed cement-based tile adhesive was applied on a concrete plate substrate as a thin layer using a straight edge trowel, followed by applying a second layer of the tile adhesive and combing in a straight line in a direction parallel to the side of the substrate using a notched trowel having 6 mm×6 mm notches at 12 mm intervals and holding the trowel at an angle of approximately 60° to the substrate. After 2 min, 2 tiles (100×100 mm) were loaded on the wet adhesive and were set with 50N loads for 30 s. After 3 min, the complete concrete plate was lifted to the vertical position and the distance traveled by tiles on the adhesive was recorded when the tile stabilized completely on the wet mortar and no further slip was observed. Results were reported in mm as the average of five (5) test results.

Density was determined by filling each indicated tile adhesive into a cylinder of a given volume and weighing the tile adhesive in the cylinder to determine the mass of the tile adhesive contents, and dividing its mass by its volume. Densities were reported after letting the adhesive composition sit for an indicated time interval.

Viscosity was a cement-based tile adhesive or mortar viscosity determined in cPs (mPa·s) at 25° C. of a cement-based tile adhesive mixed in accordance with EN 196-1, section 4.4, as measured in a cup (h=80 mm, d=100 mm) using a Brookfield viscometer RVDV II Pro (DV-II+) equipped with a Helipath stand and spindle no T-F 96 used at 5 rpm, with the viscometer calibrated as per the manufacturer's instructions. Viscosity was recorded after allowing the adhesive composition sit for the indicated time interval.

Workability was a visual test method to determine ease of application, hand feel and levelling, and was determined from the indicated cement-based tile adhesive. Workability was measured by applying the adhesive on the same gypsum board substrate as was used to determine open time using a notched edge steel trowel (20.48 cm length) at 25° C. The rating was determined by an experienced lab technician. A lower rating means better workability. Visual quality was also reported. Ratings were, as follows:

| | |
|---|---|
| 5 | Very bad |
| 4 | Bad |
| 3 | Good enough |
| 2 | Good |
| 1 | Very good |

The characteristics of the various cellulose ether materials and cement-based tile adhesives tested in the Examples are shown in Tables 4, 5 and 6, below.

TABLE 4

Results of Test Methods: Consistency

| | Example | | | | |
|---|---|---|---|---|---|
| | 1* | 2* | 3 | 4* | 5* |
| Test Result | | | | | |
| Workability (visual) | good | good | good | bad | medium |
| Workability (rating) | 5 | 5 | 5 | 3 | 4 |
| Viscosity (Brookfield, 5 rpm in Pa · s) | | | | | |
| immediately | 510 | 482 | 462 | 464 | 525 |
| after5 min | 486 | 468 | 467 | 574 | 602 |

TABLE 4-continued

Results of Test Methods: Consistency

| | Example | | | | |
|---|---|---|---|---|---|
| | 1* | 2* | 3 | 4* | 5* |
| Density (kg/L) | | | | | |
| immediately | 1.37 | 1.36 | 1.35 | 1.39 | 1.34 |
| After 5 min | 1.42 | 1.41 | 1.36 | 1.57 | 1.40 |
| Open time adhesion ($N/mm^2$) EN 1346 | | | | | |
| Time After embedding . . . | | | | | |
| 10 min | 0.74 | 0.65 | 0.58 | 0.42 | — |
| 20 min | 0.50 | 0.60 | 0.53 | 0.26 | — |
| 30 min | 0.12 | 0.44 | 0.23 | 0.04 | — |

*Denotes Comparative Example.

As shown in Table 4, above, the addition of a blend of PDMS and hydrolysable silane in Example 3 does not negatively impact workability, density or viscosity. However, as shown in Comparative Example 4, the addition of the same amount of the same hydrolysable silane leads to an increase of viscosity and density and worsens workability. Likewise, as shown in Comparative Example 5, the addition of PDMS leads to an increase of viscosity and density and worsens workability, even though the concentration of PDMS is only one-third the amount used in inventive Example 3. Further, in inventive Example 3, the blend PDMS and hydrolysable silane have a beneficial impact on open time, whereas use of (c) hydrolysable silane alone in Comparative Example 4 resulted in a significant decrease in open time. A blend of both PDMS and hydrolysable silane gives workability, density and open time properties comparable to or better than RDP 1 comprising VaE polymer.

TABLE 5

Results of Test Methods: Formulations With Various Amounts of the Granular Composition

| | Example | | | | | |
|---|---|---|---|---|---|---|
| | 6* | 7* | 8 | 9 | 10 | 11* |
| Test Result | | | | | | |
| Workability (visual) | Very good | Very good | Very good | Very good | Very good | Very good |
| Workability (rating) | 5 | 5 | 5 | 5 | 5 | 5 |
| Viscosity (Brookfield, 5 rpm in Pa · s) | | | | | | |
| immediately | 286 | 380 | 418 | 406 | 330 | 426 |
| after 15 min | 310 | 420 | 432 | 400 | 358 | 408 |
| Density (kg/L) | | | | | | |
| immediately | 1.34 | 1.35 | 1.35 | 1.35 | 1.38 | 1.32 |
| After 15 min | 1.35 | 1.39 | 1.39 | 1.39 | 1.43 | 1.41 |
| Tensile Adhesion ($N/mm^2$) EN 1348 | | | | | | |
| 28 d | 1.48 ± 0.05 | 1.54 ± 0.04 | 1.45 ± 0.03 | 1.54 ± 0.05 | 1.73 ± 0.12 | 1.52 ± 0.05 |
| $H_2O$ (7 d RT + 21 d water) | 1.06 ± 0.03 | 0.98 ± 0.08 | 1.08 ± 0.06 | 1.19 ± 0.07 | 1.22 ± 0.05 | 1.09 ± 0.03 |
| Heat (14 d RT + 14 d oven 70° C.) | 1.03 ± 0.06 | 1.23 ± 0.04 | 1.40 ± 0.05 | 1.66 ± 0.07 | 1.94 ± 0.10 | 1.70 ± 0.05 |

TABLE 5-continued

| Results of Test Methods: Formulations With Various Amounts of the Granular Composition | | | | | | |
|---|---|---|---|---|---|---|
| | Example | | | | | |
| | 6* | 7* | 8 | 9 | 10 | 11* |
| 28 Day Open time Adhesion EN 1346 -Time After embedding | (N/mm$^2$) | | | | | |
| 28 d - 10 min[1] | 1.71 | 1.51 | 1.69 | 1.62 | 1.75 | 1.57 |
| 28 d - 20 min[2] | 1.54 | 1.49 | 1.61 | 1.45 | 1.58 | 1.47 |
| 28 d - 30 min[3] | 1.24 | 1.22 | 1.24 | 1.25 | 1.42 | 1.16 |

*Denotes Comparative Example;
[1]Maximum standard deviation 0.1%.;
[2]Maximum standard deviation 0.07%.;
[3]Maximum standard deviation 0.11%.

As shown in Table 5, above, the introduction of a granular composition having both a hydrolysable silane and a polyorganosiloxane with a VaE containing RDP 1 (polyVaE) does not compromise the workability of a cement-based tile adhesive. See Examples 8, 9 and 10.

This is true even where the RDP comprises a 5% loading of the granular composition, based on the weight of the RDP as in Example 10. However, as shown in Examples 9 and 10, the preferred invention comprises more than 2 wt. % of the granular composition, based on the total weight of the RDP in the cement-based tile adhesive. Examples 9 and 10 exhibit improved adhesion after water immersion and heat aging, especially in Example 10. Compare Comparative Example 6. As shown in Examples 8, 9 and 10 when compared to the results of Comparative Example 11, introducing triethoxy (octyl) silane as the only silicon containing additive leads to a decrease in open time whereas a blend of hydrolysable silane and PDMS leads to improved open time.

TABLE 6

| Results of Test Methods: Formulations With Various RDPs | | | | | | | | | | | | |
|---|---|---|---|---|---|---|---|---|---|---|---|---|
| | | Example | | | | | | | | | | |
| | | 11* | 12* | 13 | 14* | 15* | 16 | 17* | 18* | 19 | 20* | 21* |
| Test Result | | | | | | | | | | | | |
| Workability (visual) | | Very good | Very good | Very good | Very good | Very good | Very good | Good | Very good | Very good | Very good | Very good |
| Workability (rating) | | 5 | 5 | 5 | 5 | 5 | 5 | 5-4 | 5 | 5 | 5 | 5 |
| Slip Resistance (mm) | | 1 | 1 | 1 | 0 | 0 | 0 | 2 | 1 | 2 | 2 | 1 |
| Viscosity (Brookfield, 5 rpm in Pa · s) | | | | | | | | | | | | |
| | immediately | 494 | NA | 522 | 490 | 504 | 546 | 382 | 440 | 428 | 422 | 496 |
| | After 10 min | 585 | 520 | 510 | 532 | 510 | 500 | 432 | 450 | 430 | 454 | 434 |
| Density | | | | | | | | | | | | |
| | immediately | 1.46 | NA | 1.41 | 1.46 | 1.41 | 1.46 | 1.42 | 1.39 | 1.38 | 1.30 | 1.34 |
| | After 10 min | 1.50 | 1.41 | 1.44 | 1.46 | 1.47 | 1.49 | 1.46 | 1.43 | 1.40 | 1.33 | 1.37 |
| Tensile Adhesion EN 1348 | | | | | | | | | | | | |
| | 28 d | 1.56 | 1.45 | 1.37 | 0.99 | 1.07 | 0.97 | 1.67 | 1.58 | 1.63 | 1.35 | 1.56 |
| | 7 d RT/21 d wet | 1.22 | 1.02 | 1.13 | 1.36 | 1.16 | 1.19 | 0.72 | 0.91 | 1.10 | 1.14 | 1.19 |
| | 14 d RT/14 d hot at 70° C. | 1.68 | 1.51 | 1.74 | 1.10 | 1.03 | 1.05 | 1.83 | 1.80 | 1.91 | 1.66 | 1.82 |
| Open time Adhesion | | | | | | | | | | | | |
| EN 1346 | 28 d - 10 min | NA | NA | NA | NA | NA | NA | NA | NA | NA | 1.83 | 1.96 |
| | 28 d - 20 min | 1.36 | 1.22 | 1.28 | 0.73 | 0.79 | 0.89 | 1.62 | 1.53 | 1.56 | 1.45 | 1.47 |
| | 28 d - 30 min | 1.01 | 1.02 | 1.07 | 0.59 | 0.55 | 0.55 | 1.29 | 1.14 | 1.25 | 1.15 | 1.07 |

*Denotes Comparative Example

As shown in Table 6, above, at a 5 wt. % loading of a conventional polyVaE water redispersible powder plus the inventive granular composition, the inventive composition of Example 19 exhibits standard 28 day and water immersion tensile adhesion as good as compositions in Comparative Examples 20 and 21 containing enhanced RDPs having copolymerized vinyl chloride or vinyl versatate and alkyl acrylates. However, the compositions of inventive Examples 13 and 19 exhibit superior heat aged tensile adhesion, especially where the amount of RDP plus any granular composition is increased from 3 wt. % to 5 wt. %.

We claim:

1. A storage stable powder composition for use in making a dry mix composition, wherein the powder composition comprises:

(i) a water redispersible polymer powder (RDP); and, (ii) a granular composition of (a) a silicate carrier, (b) a polydiorganosiloxane, (c) a hydrolyzable silane containing a $C_4$ to $C_{12}$ alkyl group, or an oligomer thereof, and (d) a polymer encapsulant for the hydrolyzable silane and the polydiorganosiloxane, wherein the weight ratio of the total (i) RDP to the total (ii) granular composition ranges from 90:10 to 98:2, wherein the (ii) granular composition comprises (a) from 54 to 89 wt. % of the silicate carrier, (b) from 4 to 15 wt. % of the polydiorganosiloxane, (c) from 6.5 to 25 wt. % of the hydrolysable silane, and (d) from 0.5 to 6 wt. % of the polymer encapsulant for the hydrolyzable silane and the polydiorganosiloxane, all weight proportions in the granular composition based on the total weight of the granular composition and adding up to 100%.

2. The storage stable powder composition as claimed in claim 1, wherein the (i) RDP is an ethylene-vinyl acetate (VaE) copolymer that does not contain, in copolymerized form, monomers containing a $C_4$ or higher alkyl group.

3. The storage stable powder composition as claimed in claim 1, wherein the (a) silicate carrier of the (ii) granular composition has mean diameter (×50) ranging from 0.2 to 8 μm.

4. The storage stable powder composition as claimed in claim 1, wherein the (b) polydiorganosiloxane of the (ii) granular composition has a room temperature viscosity in neat form of from 40 to 500 mPa·s.

5. The storage stable powder composition as claimed in claim 1, wherein the (b) polydiorganosiloxane of the (ii) granular composition is a hydroxyl terminal polydi($C_1$ to $C_2$ alkyl) siloxane.

6. The storage stable powder composition as claimed in claim 1, wherein the (c) hydrolyzable silane of the (ii) granular composition comprises an octyltrialkoxysilane or an oligomer thereof.

7. The storage stable powder composition in as claimed in claim 1, further comprising cement and filler, and wherein the storage stable powder composition comprises from 0.5 to 5.5 wt. % of the (i) RDP and the (ii) granular composition, based on the total weight of the powder composition.

8. The storage stable powder composition as claimed in claim 1 suitable for use as a dry mix composition for making a cement-based tile adhesive, comprising:

the (i) RDP and the (ii) granular composition in the amount of from 0.5 to 5.5 wt. %, and, further comprising, from 15 to 35 wt. %, of a cement, and, as the remainder of the dry mix composition, sand, one or more fillers or combinations thereof, all weight proportions in the dry mix composition based on the total weight of the dry mix composition and adding up to 100%.

9. The storage stable powder composition as claimed in claim 8, wherein the powder composition further comprises a cellulose ether.

10. The storage stable powder composition as claimed in claim 8, wherein a) the powder composition, when mixed with water in accordance with EN 12004:2 (2017) at 25° C. to a viscosity of 400 to 650 Pas, exhibits a tensile strength as determined according to EN 1348 of at least 1 N/mm$^2$ after each one of (i) 28 day aging at 23° C.±2° C. and standard (101.3 kPa) pressure, (ii) 7 days plus 7 hours aging at 23° C.±2° C. and standard (101.3 kPa) pressure and 20 days plus 17 hours water immersion at 23° C.±2° C. and standard (101.3 kPa) pressure, and (iii) 14 day aging at 23° C.±2° C. and standard (101.3 kPa) pressure and then 70° C. heat aging for 14 days, or, b) the powder composition, when mixed with water in accordance with EN 12004:2 (2017) at 25° C. to a viscosity of 400 to 650 Pa·s, exhibits an open time as determined in accordance with EN 1346 of at least 0.5 N/mm$^2$ 20 min after embedding the tile adhesive on a substrate.

* * * * *